United States Patent
Mitsumoto et al.

(10) Patent No.: US 10,317,149 B2
(45) Date of Patent: *Jun. 11, 2019

(54) TRANSPARENT HEAT-SHIELDING/HEAT-INSULATING MEMBER AND PRODUCTION METHOD THEREOF

(71) Applicant: Maxell Holdings, Ltd., Otokuni-gun, Kyoto (JP)

(72) Inventors: Yoshimasa Mitsumoto, Osaka (JP); Teruhisa Miyata, Osaka (JP); Noriaki Otani, Osaka (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,192

(22) Filed: Mar. 3, 2016

(65) Prior Publication Data

US 2016/0258694 A1 Sep. 8, 2016

(30) Foreign Application Priority Data

Mar. 5, 2015 (JP) ................................. 2015-043893

(51) Int. Cl.
 *F28F 13/18* (2006.01)
 *B32B 27/00* (2006.01)
 (Continued)

(52) U.S. Cl.
 CPC ................ *F28F 13/18* (2013.01); *B32B 7/12* (2013.01); *B32B 17/064* (2013.01); *B32B 27/00* (2013.01);
 (Continued)

(58) Field of Classification Search
 CPC ......... B32B 17/064; B32B 7/12; B32B 27/08; B32B 27/308; B32B 27/36; B32B 27/40;
 (Continued)

(56) References Cited

U.S. PATENT DOCUMENTS

2006/0269733 A1* 11/2006 Mizuno ................. C09D 4/00
 428/304.4
2009/0279170 A1* 11/2009 Miyazaki ............ G02B 5/3025
 359/485.01
(Continued)

FOREIGN PATENT DOCUMENTS

JP 11295503 A * 10/1999
JP 2008-36864 A 2/2008
(Continued)

OTHER PUBLICATIONS

Nakamura, Taku, JP 11-295503, "Multilayered antireflection film and image display device using same", Oct. 29, 1999 (Machine Translation).*

*Primary Examiner* — Cheng Yuan Huang
(74) *Attorney, Agent, or Firm* — Birch, Stewart, Kolasch & Birch, LLP

(57) ABSTRACT

A transparent heat-shielding/heat-insulating member includes a transparent substrate 11 and, from the transparent substrate side, an infrared reflective layer 12 and a protective layer 18 in this order. The protective layer 18 includes, from the infrared reflective layer side, a medium refractive index layer 13, a high refractive index layer 14 and a low refractive index layer 15 in this order. The medium refractive index layer 13 has a light refractive index at a wavelength of 550 nm of 1.45 to 1.55 and a thickness of 80 to 200 nm. The high refractive index layer 14 has a light refractive index at a wavelength of 550 nm of 1.65 to 1.95 and a thickness of 100 to 350 nm. The low refractive index layer 15 has a light refractive index at a wavelength of 550 nm of 1.30 to 1.45 and a thickness of 70 to 150 nm.

8 Claims, 2 Drawing Sheets

(51) Int. Cl.
*C03C 17/36* (2006.01)
*B32B 7/12* (2006.01)
*B32B 27/08* (2006.01)
*B32B 27/30* (2006.01)
*B32B 27/36* (2006.01)
*B32B 27/40* (2006.01)
*B32B 17/06* (2006.01)
*G02B 5/20* (2006.01)

(52) U.S. Cl.
CPC ............ *B32B 27/08* (2013.01); *B32B 27/308* (2013.01); *B32B 27/36* (2013.01); *B32B 27/40* (2013.01); *C03C 17/366* (2013.01); *C03C 17/3681* (2013.01); *G02B 5/208* (2013.01); *B32B 2255/20* (2013.01); *B32B 2255/205* (2013.01); *B32B 2255/26* (2013.01); *B32B 2255/28* (2013.01); *B32B 2264/10* (2013.01); *B32B 2307/304* (2013.01); *B32B 2307/412* (2013.01); *B32B 2307/418* (2013.01); *B32B 2307/712* (2013.01); *B32B 2419/00* (2013.01); *B32B 2551/00* (2013.01); *B32B 2605/006* (2013.01)

(58) Field of Classification Search
CPC .............. B32B 27/00; B32B 2307/712; B32B 2255/205; B32B 2264/10; B32B 2307/304; B32B 2307/412; B32B 2307/418; B32B 2255/28; B32B 2419/00; B32B 2551/00; B32B 2605/006; C03C 17/366; C03C 17/3681; F28F 13/18; G02B 5/208
See application file for complete search history.

(56) References Cited

U.S. PATENT DOCUMENTS

2012/0003436 A1\* 1/2012 Saie ...................... G03F 7/0007
428/195.1
2016/0003989 A1   1/2016 Watanabe et al.

FOREIGN PATENT DOCUMENTS

| JP | 2010-8497 A | 1/2010 | |
| JP | 2010-107542 A | 5/2010 | |
| JP | 2014-141015 A | 8/2014 | |
| JP | WO 2014119677 A1 \* | 8/2014 | ............... G02B 5/26 |
| JP | 2014-167617 A | 9/2014 | |
| JP | 2014-170171 A | 9/2014 | |
| JP | 2014-176995 A | 9/2014 | |
| JP | 2015-1625 A | 1/2015 | |

\* cited by examiner

TRANSPARENT HEAT-SHIELDING/HEAT-INSULATING MEMBER AND PRODUCTION METHOD THEREOF

BACKGROUND OF THE INVENTION

1. Field of the Invention

The present invention relates to a transparent heat-shielding/heat-insulating member and a production method thereof.

2. Description of Related Art

From the viewpoint of preventing global warming and saving energy, blocking heat rays from sunlight (infrared rays) through the windows of buildings, shop windows, the windows of vehicles and the like is commonly performed to reduce the indoor temperature (Patent Document 1: JP 2014-170171 A). In addition, recently, from the viewpoint of saving energy, heat-shielding/heat-insulating members that have not only heat shielding properties that block heat rays that cause a temperature increase in summer, but also a heat-insulating function that suppresses the escape of heat from inside the room in winter and reduces the heating load have been proposed and are introduced into the market (Patent Document 2: JP 2014-141015 A, Patent Document 3: JP 2014-167617 A).

Patent Document 1 discloses a transparent heat-shielding film that has an anti-reflection function and in which a hardcoat layer, an infrared absorbing layer, a high refractive index layer and a low refractive index layer are sequentially stacked on a transparent substrate. The transparent heat-shielding film disclosed in Patent Document 1 is a transparent heat-shielding film of infrared absorbing type that absorbs infrared rays entering from the outside, and therefore does not have a heat-insulating function that reflects far-infrared rays having a wavelength of 5 to 25 µm emitted from a heater toward the inside of the room in winter.

Patent Document 2 discloses an infrared reflective stacked film in which a heat ray reflective layer and a hardcoat layer are stacked in order on a substrate, the heat ray reflective layer having a multilayer structure in which a thin metal film and a thin metal oxide film are alternately stacked. The stacked film disclosed in Patent Document 2 is an infrared reflective stacked film, and has a heat-insulating function that reflects infrared rays toward the inside of the room. However, when the thickness of the hardcoat layer is reduced in order to suppress the absorption of infrared rays and allow the heat-insulating function to work, particularly the thickness of the hardcoat layer is reduced to several hundred nanometers, which overlaps the wavelength range of visible light (380 to 780 nm), even the presence of a slight variation in the thickness of the hardcoat layer produces a noticeable glittering phenomenon in the appearance called "iridescent phenomenon" caused by a multi-reflective interference between interfacial reflection at the hardcoat layer and interfacial reflection at the heat ray reflective layer, and also increases a change in the reflection color due to a change in the optical path length when viewed from a different angle, which may present a problem of appearance when it is used by being attached to a window or the like.

Patent Document 3 discloses an infrared reflective film including an infrared reflective layer and a transparent protective layer in this order on a transparent film substrate, the infrared reflective layer including a first metal oxide layer, a metal layer and a second metal oxide layer in this order, and the transparent protective layer including an organic layer. The infrared reflective film disclosed in Patent Document 3 is of infrared reflective type, and has a heat-insulating function that reflects infrared rays toward the inside of the room. However, if the thickness of the transparent protective layer is changed to 150 nm or less, which is smaller than the wavelength range of visible light, in order to suppress the iridescent phenomenon that occurs in the appearance, physical properties such as scratch resistance tend to decrease, and scratches are likely to be generated on the film surface at the time of the application of the film or while the film is used for a long period of time, which may present problems caused by the scratches such as poor appearance and corrosion.

In an infrared reflective heat-shielding film including an infrared reflective layer composed of a stack of a thin metal film and a thin metal oxide film as disclosed in Patent Documents 2 and 3, the thin metal film usually has an infrared reflecting function and is formed of a low refractive index layer that has a high visible light transmittance, and the thin metal oxide film has a protection function that, while maintaining the infrared reflecting function of the thin metal film, controls the reflectance at a wavelength in the visible light range so as to increase the transmittance in the visible light range and that suppresses migration of metals in the thin metal film, and is usually formed from a material having a refractive index as high as 1.7 or more.

Accordingly, when a UV hardcoat layer made of an acrylic resin having a refractive index of, for example, around 1.5, which is usually used as a protective layer, is formed on the infrared reflective layer composed of a stack of a thin metal film and a thin metal oxide film, a multi-reflective interference occurs at each interface due to the difference in refractive index between each layer of the infrared reflective layer and the hardcoat layer and the thickness of each layer. As a result, the reflectance at each wavelength of visible light incident on the infrared reflective film varies significantly. That is, when a visible light reflection spectrum of the infrared reflective film is obtained, a reflectance curve having a so-called "ripple", which is a shape with significant fluctuations of peaks and valleys, is observed.

Normally, a protective layer, such as a UV hardcoat layer, made of an acrylic resin is applied and formed by a wet coating method, and it is practically difficult to uniformly coat the entire surface of a substrate with the protective layer without any variation in the thickness of the layer (thickness variation). It is therefore not possible to completely eliminate the thickness variation caused by the influence of non-uniform drying, non-uniform application, the surface condition of the substrate, or the like. The thickness variation of the protective layer appears as deviations of peaks and valleys in the wavelength in the visible light reflection spectrum of the infrared reflective film, and causes the generation of an iridescent pattern.

When the thickness of the protective layer is increased to a thickness as thick as, for example, several microns, the interval between peaks and valleys decreases in the visible light reflection spectrum of the infrared reflective film, and even if there is some variation in the thickness of the protective layer, it is difficult to distinctively recognize the reflection color at a specific wavelength with the human eyes, and it is therefore almost not possible to perceive an iridescent pattern. Accordingly, the problem of appearance is unlikely to occur. However, the acrylic UV hardcoat agent used for the protective layer contains, in its molecular backbone, a large number of C=O groups, C—O groups and aromatic groups. For this reason, the acrylic UV hardcoat agent easily absorbs far-infrared rays having a wavelength of 5 to 25 μm, and the heat insulation property of the infrared reflective film tends to decrease.

Accordingly, in order to cause the infrared reflective film to have a sufficient heat insulation property, the thickness of the protective layer can be reduced to 1 μm or less so as to suppress the absorption of far-infrared rays having a wavelength of 5 to 25 μm as much as possible. However, as explained in connection with Patent Document 2 above, when the thickness of the protective layer is reduced to several hundred nanometers, which overlaps the wavelength range of visible light, the interval between peaks and valleys increases in the visible light reflection spectrum of the infrared reflective film, and the reflection color at a specific wavelength can be recognized with the human eyes. Accordingly, even if there is a slight variation in the thickness of the protective layer, it is recognized as the iridescent phenomenon. In addition, a change in the reflection color due to a change in the optical path length when viewed from a different angle is also readily perceived, which may present a problem of appearance when it is used by being attached to a window or the like.

Furthermore, as explained in connection with Patent Document 3 above, when the thickness of the protective layer is changed to 150 nm or less, which is smaller than the wavelength range of visible light, the interval between peaks and valleys further increases in the visible light reflection spectrum of the infrared reflective film, and a uniform color is observed as an interference reflection color, and thus the problem of appearance is unlikely to occur. However, the scratch resistance tends to decrease, and thus scratches are likely to be generated on the film surface at the time of the application of the film or while the film is used for a long period of time, which still may present problems caused by the scratches such as poor appearance and corrosion.

As can be seen from the foregoing, it has been difficult to provide a transparent heat-shielding/heat-insulating member that archives both an excellent heat shielding performance in summer and an excellent heat insulation performance in winter, and that has excellent scratch resistance and an excellent appearance that suppresses a reflection color change caused by the iridescent phenomenon and the viewing angle.

The present invention has been made to solve the problem described above, and provides a transparent heat-shielding/heat-insulating member having excellent scratch resistance and an excellent appearance by forming the protective layer of the infrared reflective layer as a stack of layers having specific refractive indices and thicknesses.

SUMMARY OF THE INVENTION

As a result of intensive studies conducted by the present inventors to solve the problem described above, the present inventors found that by providing a protective layer in which a medium refractive index layer, a high refractive index layer and a low refractive index layer, each having a specific thickness and refractive index, are stacked in this order on an infrared reflective layer made of a metal or metal oxide, it is possible to obtain a transparent heat-shielding/heat-insulating member that has excellent physical properties such as film scratch resistance while maintaining the heat insulation property, as well as an excellent appearance that suppresses a reflection color change caused by the iridescent phenomenon and the viewing angle, and the present invention has been accomplished.

A transparent heat-shielding/heat-insulating member according to the present invention is a transparent heat-shielding/heat-insulating member including a transparent substrate and a functional layer formed on the transparent substrate, wherein the functional layer includes, from the transparent substrate side, an infrared reflective layer and a protective layer in this order, the protective layer includes, from the infrared reflective layer side, a medium refractive index layer, a high refractive index layer and a low refractive index layer in this order, the infrared reflective layer includes a metal oxide layer and a metal layer, the medium refractive index layer has a light refractive index at a wavelength of 550 nm of 1.45 to 1.55 and a thickness of 80 to 200 nm, the high refractive index layer has a light refractive index at a wavelength of 550 nm of 1.65 to 1.95 and a thickness of 100 to 350 nm, and the low refractive index layer has a light refractive index at a wavelength of 550 nm of 1.30 to 1.45 and a thickness of 70 to 150 nm.

A method for producing a transparent heat-shielding/heat-insulating member according to the present invention includes: forming an infrared reflective layer on a transparent substrate; and forming, on the infrared reflective layer, a medium refractive index layer, a high refractive index layer and a low refractive index layer in this order by a wet coating method.

According to the present invention, the difference in reflectance between adjacent peaks and valleys in the reflective spectrum in the visible light range can be reduced, and it is therefore possible to provide a transparent heat-shielding/heat-insulating member that has an excellent heat-shielding function and heat-insulating function and that suppresses a reflection color change in the appearance caused by the iridescent phenomenon and the viewing angle.

DETAILED DESCRIPTION OF THE INVENTION

A transparent heat-shielding/heat-insulating member according to the present invention includes a transparent substrate and a functional layer formed on the transparent substrate. The functional layer includes, from the transparent substrate side, an infrared reflective layer and a protective layer in this order. The protective layer includes, from the infrared reflective layer side, a medium refractive index layer, a high refractive index layer and a low refractive index layer in this order. The infrared reflective layer includes a metal oxide layer and a metal layer. The medium refractive index layer has a light refractive index at a wavelength of 550 nm of 1.45 to 1.55 and a thickness of 80 to 200 nm. The high refractive index layer has a light refractive index at a wavelength of 550 nm of 1.65 to 1.95 and a thickness of 100 to 350 nm. The low refractive index layer has a light refractive index at a wavelength of 550 nm of 1.30 to 1.45 and a thickness of 70 to 150 nm.

With the configuration described above, the transparent heat-shielding/heat-insulating member according to the present invention suppresses the iridescent phenomenon in the appearance, undergoes little color change by the viewing angle (low viewing angle dependence), and has an excellent heat-shielding function and heat-insulating function.

Hereinafter, a transparent heat-shielding/heat-insulating member according to the present invention will be described with reference to the drawings.

Figure 1:
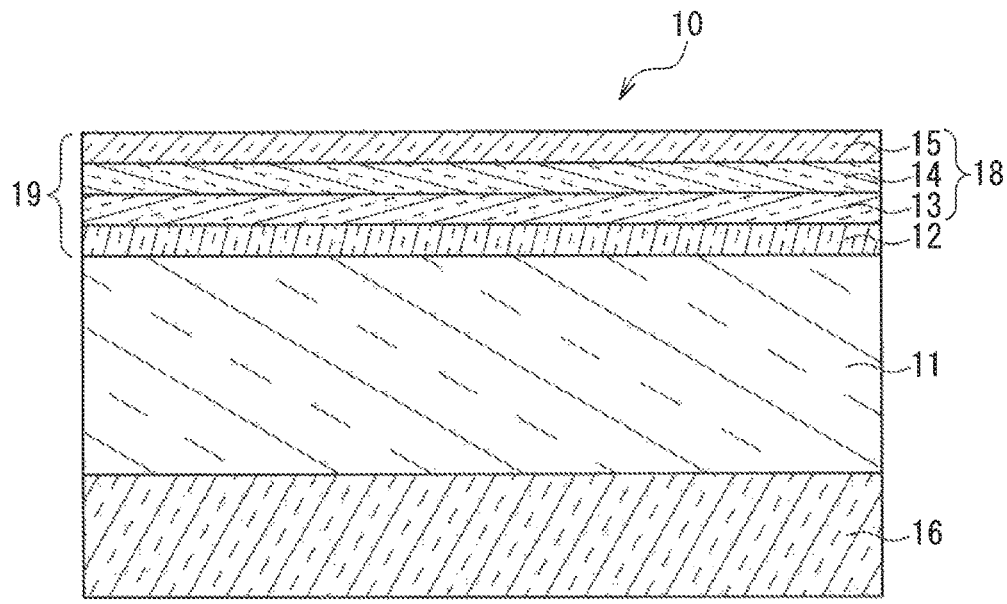
FIG. 1 is a schematic cross-sectional view showing an example of a transparent heat-shielding/heat-insulating member according to the present invention.
Figure 2:
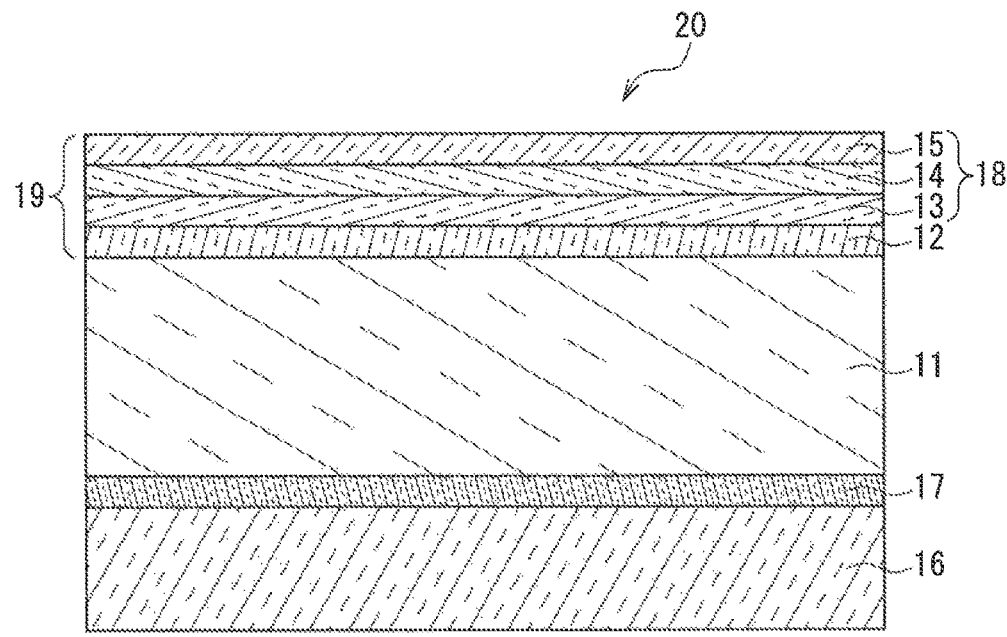
FIG. 2 is a schematic cross-sectional view showing another example of a transparent heat-shielding/heat-insulating member according to the present invention.

FIG. 1 is a schematic cross-sectional view showing an example of a transparent heat-shielding/heat-insulating member according to the present invention. In FIG. 1, a transparent heat-shielding/heat-insulating member 10 according to the present invention includes a transparent substrate 11, an infrared reflective layer 12, a medium refractive index layer 13, a high refractive index layer 14, a low refractive index layer 15, and a pressure-sensitive adhesive layer 16. The medium refractive index layer 13, the high refractive index layer 14 and the low refractive index layer 15 together form a protective layer 18, and the infrared reflective layer 12 and the protective layer 18 together form a functional layer 19. FIG. 2 is a schematic cross-sectional view showing another example of a transparent heat-shielding/heat-insulating member according to the present invention. In FIG. 2, a transparent heat-shielding/heat-insulating member 20 according to the present invention includes a transparent substrate 11, an infrared reflective layer 12, a medium refractive index layer 13, a high refractive index layer 14, a low refractive index layer 15, a cholesteric liquid crystal polymer layer 17, and a pressure-sensitive adhesive layer 16. The medium refractive index layer 13, the high refractive index layer 14 and the low refractive index layer 15 together form a protective layer 18, and the infrared reflective layer 12 and the protective layer 18 together form a functional layer 19. In other words, the transparent heat-shielding/heat-insulating member shown in FIG. 2 is obtained by further including the cholesteric liquid crystal polymer layer 17 between the transparent substrate 11 and the pressure-sensitive adhesive layer 16 of the transparent heat-shielding/heat-insulating member shown in FIG. 1.

The protective layer includes a medium refractive index layer, a high refractive index layer and a low refractive index layer in this order on the infrared reflective layer. Hereinafter, each layer will be described.

Medium Refractive Index Layer

The medium refractive index layer is preferably set to have a light refractive index at a wavelength of 550 nm of 1.45 to 1.55, and more preferably 1.43 to 1.53. The medium refractive index layer is preferably set to have a thickness of 80 to 200 nm, and more preferably 90 to 180 nm. If the thickness of the medium refractive index layer is less than 80 nm, it may lead to a reduction in the adhesion to the infrared reflective layer. If the thickness is greater than 200 nm, the absorption of light in the infrared region may increase, and thus such a thickness is not preferable.

There is no limitation on the constituent material of the medium refractive index layer as long as the refractive index of the medium refractive index layer can be set within the range described above. For example, a thermoplastic resin and an ionizing radiation curable resin are preferably used. As the thermoplastic resin, it is possible to use, for example, an acrylic resin, a polyester resin, a polyolefin resin, an epoxy resin, a polyurethane resin, a polyamide resin, a polyimide resin, a polyvinyl acetate resin, a polyvinyl alcohol resin, a polyvinyl butyral resin, a polycarbonate resin, a melamine resin, an urea resin, an alkyd resin, a phenol resin, a cellulose resin, a silicone resin, a polyacetal resin, and the like.

As the ionizing radiation curable resin, it is possible to use, for example, a multifunctional (meth)acrylate monomer having two or more unsaturated groups. Specific examples include: acrylates such as ethylene glycol di(meth)acrylate, diethylene glycol di(meth)acrylate, triethylene glycol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, and 1,2,3-cyclohexane trimethacrylate; polyurethane polyacrylates such as pentaerythritol triacrylate hexamethylene diisocyanate urethane prepolymer; esters produced from a polyhydric alcohol and a methacrylic acid such as polyester polyacrylate; vinylbenzenes such as 1,4-divinylbenzene, 4-vinyl benzoic acid-2-acryloyl ethyl ester and 1,4-divinyl cyclohexanone, and derivatives thereof. The medium refractive index layer can be formed by adding a photopolymerization initiator if necessary, followed by irradiation with ionizing radiation to cure the layer.

Among the constituent materials of the medium refractive index layer listed above, from the viewpoint of adhesion with the infrared reflective layer and low light absorption capability of absorbing light in the infrared region, it is preferable to use polyolefin resin, and in particular, a modified polyolefin resin having an acidic group. By forming the medium refractive index layer by using the modified polyolefin resin having an acidic group, the adhesion to the infrared reflective layer can be further improved. The medium refractive index layer may be formed from a modified polyolefin resin having a hydroxy group unless the adhesion of the medium refractive index layer is reduced.

There is no particular limitation on the polyolefin resin serving as the backbone of the modified polyolefin resin, but polypropylene and a polypropylene-α-olefin copolymer are preferably used. Examples of α-olefin in the polypropylene-α-olefin copolymer include ethylene, 1-butene, 1-heptene, 1-octene, 4-methyl-1-pentene. They may be used alone or in combination. There is no particular limitation on the proportion of polypropylene in the polypropylene-α-olefin copolymer, but the proportion of polypropylene is preferably 50 mol % or more and 90 mol % or less from the viewpoint of solubility in organic solvents.

There is no particular limitation on the modified polyolefin resin having an acidic group, but it is possible to use, for example, a polyolefin resin that has been acid-modified by graft copolymerization of the polyolefin resin with at least one of α,β-unsaturated carboxylic acid and an acid anhydride thereof. There is no particular limitation on the α,β-unsaturated carboxylic acid and the acid anhydride, but examples include maleic acid, itaconic acid, citraconic acid, fumaric acid, aconitic acid, crotonic acid, isocrotonic acid, acrylic acid, and anhydrides thereof. They may be used alone or in combination of two or more. Among them, from the viewpoint of versatility, it is preferable to perform modification by graft copolymerization of the polyolefin resin with at least one of maleic anhydride and itaconic anhydride.

The amount of graft copolymerization of the α,β-unsaturated carboxylic acid or the acid anhydride with respect to the polyolefin resin is preferably 0.2 to 30 mass %, and more preferably 1.0 to 10.0 mass %. If the amount of graft copolymerization is less than 0.2 mass %, the solubility in organic solvents is lowered, which may cause the stability as a medium refractive index coating material to be poor, or the adhesion to the infrared reflective layer to be insufficient. If, on the other hand, the amount of graft copolymerization is greater than 30 mass %, the absorption of light having a wavelength in the infrared region starts increasing, which may increase the normal emissivity and the heat transmission coefficient.

The modified polyolefin resin having an acidic group can be produced by a known method such as a melting method or a solution method.

The modified polyolefin resin having an acidic group may be acrylic-modified by further adding a (meth)acrylic acid monomer so as to further improve the solubility in polar solvents, the adhesion to the hardcoat agent or the like, and the compatibility. To be specific, this can be obtained by causing an unsaturated bond-containing compound having a functional group (hydroxy group or glycidyl group) reactive to an acid-modified portion of the modified polyolefin resin having an acidic group to react so as to introduce double bonds, and thereafter graft copolymerization of (meth) acrylic acid monomer.

As the unsaturated bond-containing compound having a functional group, it is preferable to use, for example, 2-hydroxyethyl acrylate, 2-hydroxypropyl acrylate, 4-hydroxybutyl acrylate, polypropylene glycol acrylate, 2-hydroxyethyl methacrylate, 2-hydroxypropyl methacrylate, 4-hydroxybutyl methacrylate, polypropylene glycol methacrylate, glycidyl acrylate, glycidyl methacrylate, and the like. It is preferable to use the unsaturated bond-containing compound in an amount of about 10 to 90 mass % with respect to the modified polyolefin resin having an acidic group.

As the (meth)acrylic acid monomer that is subjected to graft copolymerization after double bonds are introduced into the modified polyolefin resin having an acidic group, (meth)acrylic acid or a (meth)acrylic acid ester can be used. As the (meth)acrylic acid, at least one of acrylic acid and methacrylic acid can be used. Examples of the (meth)acrylic acid ester include methyl acrylate, ethyl acrylate, propyl acrylate, n-butyl acrylate, isobutyl acrylate, t-butyl acrylate, 2-ethylhexyl acrylate, lauryl acrylate, stearyl acrylate, 2-hydroxyethyl acrylate, 2-hydroxypropyl acrylate, 4-hydroxybutyl acrylate, glycidyl acrylate, cyclohexyl acrylate, polypropylene glycol acrylate, methyl methacrylate, ethyl methacrylate, propyl methacrylate, n-butyl methacrylate, isobutyl methacrylate, t-butyl methacrylate, 2-ethylhexyl methacrylate, lauryl methacrylate, stearyl methacrylate, 2-hydroxyethyl methacrylate, 2-hydroxypropyl methacrylate, 4-hydroxybutyl methacrylate, glycidyl methacrylate, cyclohexyl methacrylate, polypropylene glycol methacrylate. These (meth)acrylic acid monomers can be used alone or in combination of two or more.

Also, the modified polyolefin resin having a hydroxy group can be obtained by introducing double bonds to the modified polyolefin resin having an acidic group, and thereafter graft copolymerization of a hydroxy group-containing (meth)acrylic acid monomer such as 2-hydroxyethyl acrylate, 2-hydroxypropyl acrylate, 4-hydroxybutyl acrylate, 2-hydroxyethyl methacrylate, 2-hydroxypropyl methacrylate, or 4-hydroxybutyl methacrylate.

The modified polyolefin resin preferably has a weight-average molecular weight measured by a GPC method of 10,000 to 200,000. If the weight-average molecular weight is less than 10,000, the strength as the medium refractive index layer tends to be poor. If the weight-average molecular weight is greater than 200,000, the viscosity of the medium refractive index coating material increases, which is likely to reduce the workability.

As the modified polyolefin resin having an acidic group, commercially available products can be used such as, for example, Unistole P902 (trade name) available from Mitsui Chemicals Inc., Hardlen (trade name) available from Toyobo Co., Ltd., Auroren (trade name) available from Nippon Paper Chemicals Co., Ltd., Surflen (trade name) available from Mitsubishi Chemical Corporation, Sumifitt (trade name) available from Sumika Chemtex Co., Ltd., and Zaikthene (trade name) available from Sumitomo Seika Chemicals Co., Ltd. Likewise, as the modified polyolefin resin having a hydroxy group, commercially available products can be used such as, for example, Unistole P901 (trade name) available from Mitsui Chemicals Inc., and Polytale (trade name) available from Mitsubishi Chemical Corporation.

High Refractive Index Layer

The high refractive index layer is preferably set to have a light refractive index at a wavelength of 550 nm of 1.65 to 1.95, and more preferably 1.70 to 1.90. The high refractive index layer is set to have a thickness of 100 to 350 nm, and preferably 120 to 300 nm. If the thickness of the high refractive index layer is less than 100 nm, physical properties such as scratch resistance of the film surface may decrease. A thickness greater than 350 nm is not preferable because, if the high refractive index layer contains a large amount of inorganic fine particles, the absorption of light in the infrared region increases, which may lead to a reduction in the heat transmission coefficient.

There is no particular limitation on the constituent material of the high refractive index layer as long as the refractive index of the high refractive index layer can be set within the range described above, but in terms of physical properties such as scratch resistance, it is preferable to use a material made of an ionizing radiation curable resin and inorganic fine particles dispersed in the ionizing radiation curable resin. As the ionizing radiation curable resin, for example, a multifunctional (meth)acrylate monomer having two or more unsaturated groups can be used. Specific examples include: acrylates such as ethylene glycol di(meth)acrylate, diethylene glycol di(meth)acrylate, triethylene glycol di(meth)acrylate, 1,4-cyclohexanediacrylate, pentaerythritol tetra (meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,2,3-cyclohexane trimethacrylate; polyurethane polyacrylates such as pentaerythritol triacrylate hexamethylene diisocyanate urethane prepolymer; esters produced from a polyhydric alcohol and a (meth)acrylic acid such as polyester polyacrylate; vinylbenzenes such as 1,4-divinylbenzene, 4-vinyl benzoic acid-2-acryloyl ethyl ester and 1,4-divinyl cyclohexanone, and derivatives thereof. The high refractive index layer can be formed by adding a photopolymerization initiator if necessary, followed by irradiation with ionizing radiation to cure the layer.

The inorganic fine particles are added in order to adjust the refractive index of the high refractive index layer. As the inorganic fine particles, it is possible to use titanium oxide ($TiO_2$), zirconium oxide ($ZrO_2$), zinc oxide (ZnO), indium tin oxide (ITO), niobium oxide ($Nb_2O_5$), yttrium oxide ($Y_2O_3$), indium oxide ($In_2O_3$), tin oxide ($SnO_2$), antimony oxide ($Sb_2O_3$), tantalum oxide ($Ta_2O_5$), tungsten oxide ($WO_3$), and the like. Among the inorganic fine particles listed above, it is preferable to use titanium oxide and zirconium oxide because a high refractive index can be attained by addition of a small amount thereof, and it is more preferable to use titanium oxide because the absorption of light in the infrared region is small.

As the particle size of the inorganic fine particles, from the viewpoint of transparency of the high refractive index layer, the inorganic fine particles preferably have an average particle size of 5 to 100 nm, and more preferably 10 to 80 nm. If the average particle size is greater than 100 nm, the haze value increases in the formed high refractive index layer, which is likely to cause a reduction in the transparency. If the average particle size is less than 5 nm, it is difficult to maintain dispersion stability of the inorganic fine particles when used in a high refractive index coating material.

Low Refractive Index Layer

The low refractive index layer is preferably set to have a light refractive index at a wavelength of 550 nm of 1.30 to 1.45, and more preferably 1.35 to 1.43. The low refractive index layer is set to have a thickness of 70 to 150 nm, and preferably 80 to 130 nm. If the thickness of the low refractive index layer is outside the range of 70 to 150 nm, the size of ripple in the reflective spectrum in the visible light region increases, which not only makes an iridescent pattern more noticeable, but also increases the reflection color change due to the viewing angle, which may present a problem of appearance.

There is no particular limitation on the constituent material of the low refractive index layer as long as the refractive index of the low refractive index layer can be set within the range described above, but in terms of physical properties such as scratch resistance, it is preferable to use a material made of an ionizing radiation curable resin and low refractive index inorganic fine particles. As the ionizing radiation curable resin, a multifunctional (meth)acrylate monomer having two or more unsaturated groups, which was mentioned above as the constituent material of the medium refractive index layer, can be used. As the low refractive index inorganic fine particles, for example, silicon oxide, magnesium fluoride, aluminum fluoride and the like can be used. However, from the viewpoint of the physical properties of the film surface, it is particularly preferable to use a silicon oxide-based material, in particular, hollow silicon oxide (hollow silica) having pores inside, in order to attain a low refractive index.

Protective Layer

The protective layer composed of the medium refractive index layer, the high refractive index layer and the low refractive index layer preferably has a total thickness of 250 to 700 nm, and more preferably 300 to 600 nm. If the total thickness is less than 250 nm, physical properties such as scratch resistance and corrosion resistance may be reduced. If the total thickness is greater than 700 nm, the absorption of infrared rays increases, which may lead to a reduction in the heat insulation property, and thus such a thickness is not preferable. If the total thickness is within the above range, a normal emissivity measured based on the Japanese Industrial Standards (JIS) R3106 of 0.2 or less is attained on the functional layer side, and a sufficient heat insulation performance can be achieved.

Infrared Reflective Layer

The infrared reflective layer is preferably composed of a conductive stacked film. Furthermore, for the purpose of improving the transmittance in the visible light region, the conductive stacked film preferably includes, from the transparent substrate side, at least a metal oxide layer, a metal layer made of a metal such as silver, copper, gold or aluminum, and the metal oxide layer in this order.

As the constituent material of the metal oxide layer, it is possible to use, as appropriate, metal oxide materials such as indium tin oxide (refractive index n=1.92), indium zinc oxide (n=2.00), indium oxide (n=2.00), titanium oxide (n=2.50), tin oxide (n=2.00), zinc oxide (n=2.03), niobium oxide (n=2.30), aluminum oxide (n=1.77), and the like. The metal oxide layer can be formed by forming the above material into a film by a dry coating method such as a sputtering method or a vapor deposition method. Each metal oxide layer may have a thickness of 5 to 30 nm. The metal oxide layer preferably has a refractive index of 1.6 or more, and more preferably 1.7 or more.

As the constituent material of the metal layer, metal materials such as silver (n=0.12), copper (n=0.95), gold (n=0.35) and aluminum (n=0.96) can be used as appropriate. Among them, from the viewpoint of transparency, it is preferable to use silver. For the purpose of improving corrosion resistance, it is also possible to use an alloy containing at least one or more of palladium, gold, copper, aluminum, bismuth, nickel, niobium, magnesium, zinc and the like. The metal layer can be formed by forming the above material into a film by a dry coating method such as a sputtering method or a vapor deposition method. Each metal layer may have a thickness of 3 to 15 nm.

The infrared reflective layer is preferably set to have an average light reflectance at a wavelength of 5.5 to 25.2 μm of 80% or more, more preferably 85% or more, and even more preferably 90% or more. It is thereby possible to, even when a protective layer is provided in the transparent heat-shielding/heat-insulating member of the present invention, adjust the normal emissivity to be 0.2 or less, and reliably impart a heat-insulating function to the transparent heat-shielding/heat-insulating member.

Transparent Substrate

There is no particular limitation on the transparent substrate that constitutes the transparent heat-shielding/heat-insulating member of the present invention as long as it is made of a light transmitting material. As the transparent substrate, it is possible to use a film or sheet formed from, for example, a resin such as a polyester resin (for example, polyethylene terephthalate, polyethylene naphthalate or the like), a polycarbonate resin, a polyacrylic acid ester resin (for example, polymethyl methacrylate or the like), an alicyclic polyolefin resin, a polystyrene resin (for example, polystyrene, an acrylonitrile-styrene copolymer (AS resin) or the like), a polyvinyl chloride resin, a polyvinyl acetate resin, a polyethersulfone resin, a cellulose resin (for example, diacetyl cellulose, triacetyl cellulose or the like), or a norbornene resin. As the method for forming the resin into a film or sheet, it is possible to use an extrusion method, a calendering method, a compression molding method, an injection molding method, a method in which the above resin is dissolved in a solvent and thereafter subjected to casting, or the like. The resin may further contain additives such as an antioxidant, a flame retardant, an anti-heat resistant agent, an ultraviolet absorbing agent, a lubricant, and an anti-static agent. The thickness of the transparent substrate is, for example, 10 to 500 μm, and is preferably 25 to 125 μm, considering the processability and the cost.

Cholesteric Liquid Crystal Polymer Layer

In the transparent heat-shielding/heat-insulating member of the present invention, a cholesteric liquid crystal polymer layer may be further formed on a surface of the transparent substrate on which the infrared reflective layer is not formed as long as transparency is not lost. With this configuration, the heat-shielding function of the transparent heat-shielding/heat-insulating member of the present invention can be further improved.

The cholesteric liquid crystal polymer layer can be formed by photopolymerization of a material containing a liquid crystal compound having a polymerizable functional group, a chiral agent having a polymerizable functional group and a multifunctional acrylate compound.

A cholesteric liquid crystal polymer can be obtained by adding a small amount of optically active compound (chiral agent) to a nematic liquid crystal compound containing rod-like molecules. The cholesteric liquid crystal polymer has a layered structure having alternating layers of a nematic liquid crystal compound. In each layer, the nematic liquid crystal compound is aligned in a certain direction, and the layers are accumulated such that a helical shape is formed in the alignment direction of the liquid crystal compound. Accordingly, the cholesteric liquid crystal polymer can selectively reflect only light having a specific wavelength according to the helical pitch.

A normal cholesteric liquid crystal polymer has a feature in that the helical pitch changes according to the temperature and the wavelength of reflected light changes. By making a mixture containing a liquid crystal compound having a polymerizable functional group and a chiral agent having a polymerizable functional group uniform in a liquid crystal state and thereafter irradiating the mixture with active energy rays such as ultraviolet rays while the liquid crystal state is maintained, it is possible to produce a layer containing a cholesteric liquid crystal polymer in which the alignment state of the liquid crystal compound is semi-permanently fixed.

With the cholesteric liquid crystal polymer layer obtained in the manner described above, the wavelength of reflected light does not change according to the temperature, and thus the reflection wavelength can be semi-permanently fixed. Also, the cholesteric liquid crystal polymer layer has a cholesteric liquid crystal optical rotation, and thus when the rotation direction and wavelength of circularly polarized light are equal to the rotation direction of liquid crystal molecules and the helical pitch, reflection takes place without passing through the light. Normally, sunlight is composed of right-handed circularly polarized light and left-handed circularly polarized light. Accordingly, by stacking a cholesteric liquid crystal polymer layer in which the direction of the optical rotation is set to a specific helical pitch by using a right-handed chiral agent and a cholesteric liquid crystal polymer layer in which the direction of the optical rotation is set to a specific helical pitch by using a left-handed chiral agent, the reflectance at a selective reflection wavelength can be further increased.

The thickness of the cholesteric liquid crystal polymer layer is preferably greater than or equal to 1.5 times and less than or equal to 4.0 times the wavelength at which incident light is reflected at a maximum (maximum reflectance wavelength), and is more preferably greater than or equal to 1.7 times and less than or equal to 3.0 times the maximum reflectance wavelength. If the thickness of the cholesteric liquid crystal polymer layer is less than 1.5 times the maximum reflectance wavelength, it is difficult to maintain the orientation of the cholesteric liquid crystal polymer layer, and the light reflectance may be reduced. If, on the other hand, the thickness of the cholesteric liquid crystal polymer layer is greater than 4.0 times the maximum reflectance wavelength, although the orientation and light reflectance of the cholesteric liquid crystal polymer layer can be favorably maintained, the cholesteric liquid crystal polymer layer may be too thick. The thickness of the cholesteric liquid crystal polymer layer is, for example, 0.5 μm or more and 20 μm or less, and preferably 1 μm or more and 10 μm or less.

The structure of the cholesteric liquid crystal polymer layer is not limited to a mono-layer structure, and may be a multi-layer structure. The multi-layer structure is preferable because the layers have different selective reflection wavelengths and thereby the wavelength range in which light is reflected can be broadened.

Hereinafter, the material for forming the cholesteric liquid crystal polymer layer will be described in detail.

Liquid Crystal Compound Having Polymerizable Functional Group

A liquid crystal compound having a polymerizable functional group is used to form the cholesteric liquid crystal polymer layer. As the liquid crystal compound, a known compound can be used such as the one disclosed in, for example, in Chapter 8 of "Liquid Crystals—Fundamentals and Applications" by Shoichi Matsumoto and Ichiro Tsunoda, Kogyo Chosakai Publishing Co., Ltd.

Specific examples of the liquid crystal compound include compounds disclosed in, for example, JP 2012-6997 A, JP 2012-168514 A, JP 2008-217001 A, WO 95/22586, JP 2000-281629 A, JP 2001-233837 A, JP 2001-519317 T, JP 2002-533742 T, JP 2002-308832 A, JP 2002-265421 A, JP 2005-309255 A, JP 2005-263789 A, JP 2008-291218 A, JP 2008-242349 A, and the like.

The liquid crystal compound used to form the cholesteric liquid crystal polymer layer may be made of a single compound. However, if the orientation of the cholesteric liquid crystal polymer layer, when formed by using a single compound, is easily disturbed, a high melting point liquid crystal compound and a low melting point liquid crystal compound may be used in combination. In this case, it is preferable that the difference in melting point between the high melting point liquid crystal compound and the low melting point liquid crystal compound is 15° C. or more and 30° C. or less, and more preferably 20° C. or more and 30° C. or less.

In the case where the high melting point liquid crystal compound and the low melting point liquid crystal compound are used in combination as the liquid crystal compound, the high melting point liquid crystal compound preferably has a melting point that is greater than or equal to the glass transition temperature of the transparent substrate. If the liquid crystal compound has a low melting point, it has excellent compatibility and solubility with respect to the chiral agent and the solvent, but if the melting point is too low, the resultant transparent heat-shielding/heat-insulating member has poor heat resistance. For this reason, at least the high melting point liquid crystal compound is preferably set to have a melting point that is greater than or equal to the glass transition temperature of the transparent substrate.

As the combination of the high melting point liquid crystal compound and the low melting point liquid crystal compound, commercially available products can be used. Examples include a combination of PLC 7700 (trade name, melting point: 90° C.) and PLC 8100 (trade name, melting point: 65° C.) available from ADEKA Corporation, a combination of PLC 7700 (melting point: 90° C.) and PLC 7500 (trade name, melting point: 65° C.) available from ADEKA Corporation, and a combination of UCL-017A (trade name, melting point; 96° C.) and UCL-017 (trade name, melting point: 70° C.) available from DIC Corporation.

In the case where three or more compounds are used as the liquid crystal compound having a polymerizable functional group, the compound having the highest melting point is used as the high melting point liquid crystal compound, and the compound having the lowest melting point is used as the low melting point liquid crystal compound.

In the case where two or more compounds are used in combination as the liquid crystal compound having a polymerizable functional group, the proportion of the high melting point liquid crystal compound is preferably 90 mass % or less in the entire liquid crystal compound. If the proportion of the high melting point liquid crystal compound is greater than 90 mass %, the compatibility of the liquid crystal compound tends to decrease, and as a result, the orientation of the cholesteric liquid crystal polymer layer may be partially disturbed, causing an increase in haze.

Chiral Agent Having Polymerizable Functional Group

There is no particular limitation on the structure of the chiral agent having a polymerizable functional group used to form the cholesteric liquid crystal polymer layer as long as the chiral agent has good compatibility with the liquid crystal compound and can be dissolved in a solvent, and a conventionally used chiral agent having a polymerizable functional group can be used.

Specific examples of the chiral agent include compounds disclosed in, for example, WO 98/00428, JP H9-506088 A, JP H10-509726 T, JP 2000-44451 A, JP 2000-506873 T, JP 2003-66214A, JP 2003-313187A, U.S. Pat. No. 6,468,444, and the like. As the chiral agent, commercially available products can be used such as S101, R811 and CB15 (trade name) available from Merck, Ltd.; PALIOCOLOR LC 756 (trade name) available from BASF Ltd.; and CNL715 and CNL716 (trade name) available from ADEKA Corporation.

The selective reflection wavelength of the cholesteric liquid crystal polymer layer can be controlled by adjusting the helical pitch. The helical pitch can be controlled by adjusting the amounts of the liquid crystal compound and the chiral agent. For example, when the concentration of the chiral agent is high, the helical twisting force increases, and thus the helical pitch is reduced. As a result, the selective reflection wavelength $\lambda$ of the cholesteric liquid crystal polymer layer shifts to the short wavelength side. If, on the other hand, the concentration of the chiral agent is low, the helical twisting force decreases, and thus the helical pitch is increased. As a result, the selective reflection wavelength $\lambda$ of the cholesteric liquid crystal polymer layer shifts to the long wavelength side. Accordingly, the amount of the chiral agent is preferably 0.1 parts by mass or more and 10 parts by mass or less, and more preferably 0.2 parts by mass or more and 7.0 parts by mass or less with respect to 100 parts by mass of the total of the liquid crystal compound and the chiral agent. If the amount of the chiral agent is 0.1 parts by mass or more and 10 parts by mass or less, the selective reflection wavelength of the resulting cholesteric liquid crystal polymer layer can be controlled so as to be in the near infrared region.

The selective reflection wavelength of the cholesteric liquid crystal polymer layer can be controlled by adjusting the amount of the chiral agent as described above. By controlling the selective reflection wavelength so as to be in the near infrared region, it is possible to obtain a transparent heat-shielding/heat-insulating member that does not substantially absorb light in the visible light region, or in other words, that is transparent in the visible light region and is capable of selectively reflecting light in the near infrared region. The maximum reflectance wavelength of the transparent heat-shielding/heat-insulating member can be set to, for example, 800 nm or more.

Multifunctional Acrylate Compound

As the multifunctional acrylate compound used to form the cholesteric liquid crystal polymer layer, any compound can be used as appropriate as long as it has good compatibility with the liquid crystal compound and the chiral agent and does not disturb the orientation of the cholesteric liquid crystal polymer layer.

The multifunctional acrylate compound is used to improve the curability of the liquid crystal compound having a polymerizable functional group and the chiral agent having a polymerizable functional group, and is added in an amount that does not disturb the orientation of the cholesteric liquid crystal polymer layer. To be specific, the amount of the multifunctional acrylate compound may be 0.5 parts by mass or more and 5 parts by mass or less, and preferably 1 part by mass or more and 3 parts by mass or less with respect to 100 parts by mass of the total of the liquid crystal compound and the chiral agent.

Pressure-Sensitive Adhesive Layer

In the transparent heat-shielding/heat-insulating member of the present invention, it is preferable to dispose a pressure-sensitive adhesive layer on the opposite side of the protective layer. With this configuration, the transparent heat-shielding/heat-insulating member of the present invention can be easily attached to a glass substrate or the like. As the material of the pressure-sensitive adhesive layer, for example, an acrylic resin, a polyester resin, a urethane resin, a rubber-based resin, a silicone resin or the like can be used. The thickness of the pressure-sensitive adhesive layer is preferably 10 to 100 µm, and more preferably 15 to 50 µm.

Transparent Heat-Shielding/Heat-Insulating Member

With the transparent heat-shielding/heat-insulating member of the present invention, even after it is subjected to a 1000-hour weather resistance test according to JIS A5759, separation of the protective layer is not observed in a cross cut adhesion test according to JIS D0202-1998.

The transparent heat-shielding/heat-insulating member of the present invention can be set to have, when the pressure-sensitive adhesive layer disposed on the transparent substrate is attached to a glass substrate, an average light reflectance at a wavelength of 5.5 to 25.2 µm of 70% or more, the average light reflectance being measured by applying light from the opposite side of the glass substrate.

Also, with the transparent heat-shielding/heat-insulating member of the present invention, the heat-insulating function and the heat-shielding function can be provided by the infrared reflective layer, and the scratch resistance can be improved by the protective layer. Furthermore, the transparent heat-shielding/heat-insulating member of the present invention can further improve the heat-shielding function by further disposing the cholesteric liquid crystal polymer layer.

The transparent heat-shielding/heat-insulating member of the present invention is in the form of a film or sheet, and can be used by being attached to a glass substrate or the like, but may be used in any other form.

Next, an example of a method for producing a transparent heat-shielding/heat-insulating member according to the present invention will be described with reference to FIG. 1.

First, an infrared reflective layer 12 is formed on one of the surfaces of the transparent substrate 11. The infrared reflective layer 12 can be formed by a method of, for example, sputtering a conductive material, but may be formed by any other method. The infrared reflective layer 12 is preferably configured to have a three-layer structure including a high refractive index conductive layer, a low refractive index conductive layer and a high refractive index conductive layer, from the viewpoint of the heat-shielding/heat-insulating function.

Next, a medium refractive index layer 13 is formed on the infrared reflective layer 12. Subsequently, a high refractive index layer 14 is formed on the medium refractive index layer 13. Furthermore, a low refractive index layer 15 is formed on the high refractive index layer 14. Each of these layers can be formed by a wet coating method. It is thereby possible to, even when the infrared reflective layer 12 is provided on the indoor side, prevent the infrared reflective layer 12 from damage caused by cleaning the window or the like. Also, in terms of the appearance, it is possible to suppress angle dependence such as a change in reflection color caused by the iridescent phenomenon or the viewing angle.

Finally, a pressure-sensitive adhesive layer 16 is formed on the other surface of the transparent substrate 11. There is no particular limitation on the method for forming the pressure-sensitive adhesive layer 16, and the pressure-sensitive adhesive layer 16 may be formed by applying a pressure-sensitive adhesive directly onto the outer surface of the transparent substrate 11, or by attaching a separately prepared pressure-sensitive adhesive sheet to the outer surface of the transparent substrate 11.

Through the process described above, an example of a transparent heat-shielding/heat-insulating member of the present invention is obtained, and is used by being attached to a glass substrate or the like as needed.

Hereinafter, the present invention will be described in detail by way of examples. It is to be noted, however, that the present invention is not limited to the examples given below. Also, unless otherwise stated, the term "part(s)" means "part(s) by mass".

Measurement of Refractive Index

The refractive indices of the medium refractive index layer, the high refractive index layer and the low refractive index layer obtained in each of the following examples and comparative examples were measured by the following method.

A film sample for refractive index measurement was produced by applying a coating material for forming each layer onto a surface, not being subjected to an adhesion promotion treatment, of a polyethylene terephthalate (PET) film A4100 (trade name, thickness: 50 μm) available from Toyobo Co., Ltd. having an adhesion promoted surface, so as to have a thickness of 500 nm, and then drying the coating material. In the case of using an ultraviolet curable coating material in the coating material for forming each layer, the film sample for refractive index measurement was produced by further, after drying, applying ultraviolet rays in an amount of 300 mJ/cm$^2$ with a high-pressure mercury lamp so as to cure the coating material.

A black tape was attached to the back side of the produced sample for refractive index measurement, a reflective spectrum was obtained by using a reflectance spectroscopic thickness meter FE-3000 (available from Otsuka Electronics Co., Ltd.), and fitting was performed from n-Cauchy equation based on the obtained reflective spectrum, and the light refractive index at a wavelength of 550 nm of each layer was obtained.

Measurement of Thickness

The thicknesses of the medium refractive index layer, the high refractive index layer and the low refractive index layer obtained in each of the following examples and comparative examples were measured by attaching a black tape on a surface of the transparent substrate on which the infrared reflective layer and the protective layer were not formed, obtaining a reflective spectrum for each layer by an instantaneous multi-purpose photometric system MCPD-3000 (available from Otsuka Electronics Co., Ltd.), and performing optimization fitting by using a refractive index obtained by the above refractive index measurement from the obtained reflective spectrum.

Example 1

Production of Infrared Reflective Layer-Bearing Transparent Substrate

Figure 3:
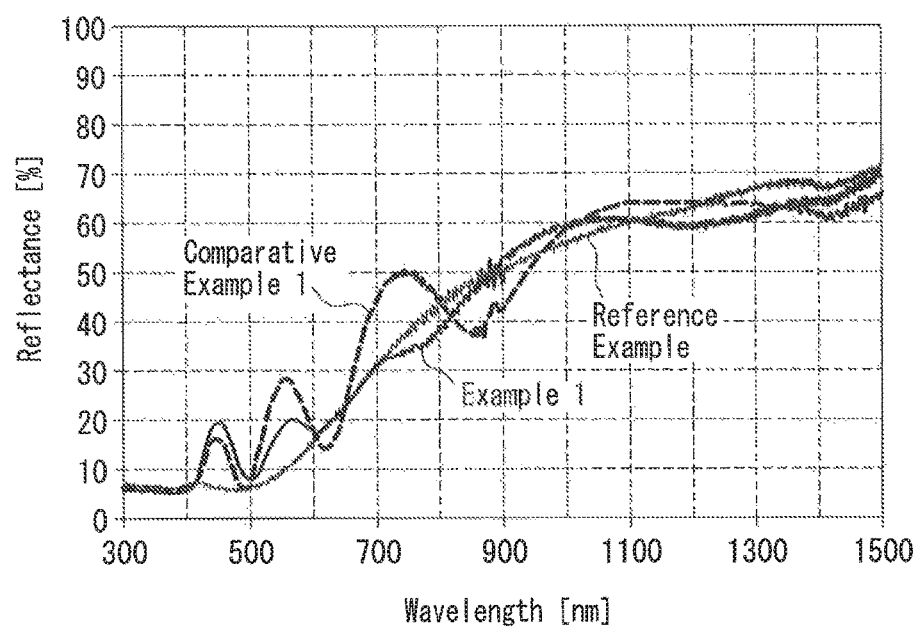
FIG. 3 is a diagram showing a representative reflective spectrum of a transparent heat-shielding/heat-insulating member.

First, an infrared reflective layer-bearing transparent substrate was produced by, using the aforementioned PET film A4100 as a transparent substrate, forming a conductive stacked film (infrared reflective layer) having a three-layer structure composed of a 30 nm thick ITO (indium tin oxide) layer, a 12 nm thick silver layer and a 30 nm thick ITO layer on the adhesion promoted surface of the PET film by sputtering. A reflective spectrum of the infrared reflective layer-side surface of the infrared reflective layer-bearing transparent substrate is shown in FIG. 3 as a reference example. It can be seen from FIG. 3 that no significant fluctuations of peaks and valleys (ripple) are observed in the reference reflective spectrum.

Formation of Medium Refractive Index Layer

A medium refractive index coating material A was produced by mixing, in a Disper, 10 parts of modified polyolefin resin solution Hardlen NS-2002 (trade name, acid-modified type, solid content: 20 mass %, refractive index: 1.51) available from Toyobo Co., Ltd., 80 parts of methylcyclohexane as a diluting solvent, and 20 parts of methyl isobutyl ketone. Next, the medium refractive index coating material A was applied onto the infrared reflective layer by using a micro-gravure coater (available from Yasui Seiki Co., Ltd.) and dried so as to have a dry thickness of 130 nm, and a 130 nm thick medium refractive index layer was thereby formed on the infrared reflective layer.

High Refractive Index Layer

A mixed solution was prepared by mixing 30 parts of titanium oxide ultra-fine particles TTO-55(A) (trade name) available from Ishihara Sangyo Ltd., 1 part of dimethyl aminoethyl methacrylate Light Ester DM (trade name) available from Kyoeisha Chemical Co., Ltd., 4 parts of phosphoric acid group-containing methacrylate KAYAMER PM-21 (trade name) available from Nippon Kayaku Co., Ltd., and 65 parts of cyclohexanone. Zirconia beads having a diameter of 0.3 mm were added to the mixed solution, and dispersed by using a paint conditioner (available from Toyo Seiki Co., Ltd.), and a titanium oxide ultra-fine particle dispersion was thereby prepared. Fifteen parts of urethane modified acrylate resin DPHA-40H (trade name) available from Nippon Kayaku Co., Ltd., 1 part of photopolymerization initiator Irgacure 184 (trade name) available from BASF Ltd. and 600 parts of methyl isobutyl ketone were added to the titanium oxide ultra-fine particle dispersion, and a high refractive index coating material A was thereby produced. The refractive index of the produced high refractive index coating material A was measured by the above-described method and found to be 1.80.

Next, the high refractive index coating material A was applied onto the medium refractive index layer by using the aforementioned micro-gravure coater and dried so as to have a dry thickness of 300 nm, and thereafter irradiated with ultraviolet rays in an amount of 300 mJ/cm$^2$ with a high-pressure mercury lamp so as to cure the coating material. A 300 nm thick high refractive index layer was thereby formed.

Low Refractive Index Layer

A hollow silica-containing low refractive index coating material ELCOM P-5062 (trade name, solid content: 3 mass %, refractive index: 1.38) available from JGC Catalysts and Chemicals Ltd. was used as a low refractive index coating material A, and the low refractive index coating material A was applied onto the high refractive index layer by using the aforementioned micro-gravure coater and dried so as to have a dry thickness of 100 nm, and thereafter irradiated with ultraviolet rays in an amount of 300 mJ/cm$^2$ with a high-pressure mercury lamp so as to cure the coating material. A 100 nm thick low refractive index layer was thereby formed.

In the manner described above, a protective layer-bearing infrared reflective film (transparent heat-shielding/heat-insulating member) was produced. In FIG. 3, a reflective spectrum of the protective layer-side surface of the protective layer-bearing infrared reflective film is indicated by Example 1. It can be seen from FIG. 3 that almost no significant fluctuations of peaks and valleys (ripple) are observed in the reflective spectrum in the visible light range of Example 1.

Formation of Pressure-Sensitive Adhesive Layer

First, a PET film NS-38+A (trade name, thickness: 38 μm) available from Nakamoto Packs Co., Ltd. having a silicone-treated surface was prepared. Also, a pressure-sensitive adhesive coating material was prepared by adding 1.25 parts of ultraviolet absorbing agent (benzophenone) available from Wako Pure Chemical Industries, Ltd. and 0.27 parts of cross-linking agent E-AX (trade name, solid content: 5%) available from Soken Chemical & Engineering Co., Ltd. to 100 parts of acrylic pressure-sensitive adhesive SK Dyne 2094 (trade name, solid content: 25 mass %) available from Soken Chemical & Engineering Co., Ltd., and mixing them in a Disper.

Next, the pressure-sensitive adhesive coating material was applied onto the silicone-treated surface of the PET film and dried so as to have a dry thickness of 25 μm, and a pressure-sensitive adhesive layer was thereby formed. Furthermore, the surface of the protective layer-bearing infrared reflective film on which the infrared reflective layer was not formed was attached to the upper surface of the pressure-sensitive adhesive layer, and a pressure-sensitive adhesive layer-bearing infrared reflective film was thereby produced.

Attachment to Glass Substrate

First, a 3 mm-thick float glass sheet (available from Nippon Sheet Glass Co. Ltd.) was prepared as a glass substrate. Next, the PET film was removed from the pressure-sensitive adhesive layer-bearing infrared reflective film, and the pressure-sensitive adhesive layer-side surface of the pressure-sensitive adhesive layer-bearing infrared reflective film was attached to the float glass sheet.

Example 2

A high refractive index coating material B was produced by mixing, in a Disper, 100 parts of zirconium oxide dispersion liquid SZR-K (trade name, solid content: 30 mass %) available from Sakai Chemical Industry Co., Ltd., 7.5 parts of urethane modified acrylate resin DPHA-40H (trade name) available from Nippon Kayaku Co., Ltd., and 0.3 parts of photopolymerization initiator Irgacure 184 (trade name) available from BASF Ltd. The refractive index of the produced high refractive index coating material B was measured by the above-described method and found to be 1.74. Next, a protective layer-bearing infrared reflective film was produced in the same manner as in Example 1 except that the high refractive index coating material B was used, and the produced protective layer-bearing infrared reflective film was then attached to a glass substrate.

Example 3

A high refractive index coating material C was produced in the same manner as in Example 1 except that in the high refractive index coating material A of Example 1, the amount of urethane modified acrylate resin DPHA-40H was changed to 7.5 parts. The refractive index of the produced high refractive index coating material C was measured by the above-described method and found to be 1.90. Next, a protective layer-bearing infrared reflective film was produced in the same manner as in Example 1 except that the high refractive index coating material C was used, and the produced protective layer-bearing infrared reflective film was then attached to a glass substrate.

Example 4

A low refractive index coating material B was produced by mixing, in a Disper, 40 parts of magnesium fluoride slurry whose surface has been modified with an acryl group MFDNB15WT %-G37 (trade name) available from C. I. Kasei Company, Ltd., 10 parts of pentaerythritol triacrylate PE-3A (trade name) available from Kyoeisha Chemical Co., Ltd., 50 parts of photocurable fluorocarbon resin AR-100 (trade name) available from Daikin Industries Ltd., 5 parts of photopolymerization initiator Irgacure 907 (trade name) available from BASF Ltd., and 1330 parts of methyl isobutyl ketone. The refractive index of the produced low refractive index coating material B was measured by the above-described method and found to be 1.40. Next, a protective layer-bearing infrared reflective film was produced in the same manner as in Example 1 except that the low refractive index coating material B was used, and the produced protective layer-bearing infrared reflective film was then attached to a glass substrate.

Example 5

A medium refractive index coating material B was produced by mixing, in a Disper, 9.5 parts of pentaerythritol triacrylate PE-3A (trade name) available from Kyoeisha Chemical Co., Ltd., 0.5 parts of phosphoric acid group-containing methacrylate KAYAMER PM-21 (trade name) available from Nippon Kayaku Co., Ltd., 0.3 parts of photopolymerization initiator Irgacure 184 (trade name) available from BASF Ltd., and 490 parts of methyl isobutyl ketone. The refractive index of the produced medium refractive index coating material B was measured by the above-described method and found to be 1.50.

Next, a 130 nm-thick medium refractive index layer was formed by applying the medium refractive index coating material B onto an infrared reflective layer produced in the same manner as in Example 1 by using the aforementioned micro-gravure coater and dried so as to have a dry thickness of 130 nm, and thereafter irradiated with ultraviolet rays in an amount of 300 mJ/cm$^2$ with a high-pressure mercury lamp so as to cure the coating material. A protective layer-bearing infrared reflective film was produced in the same manner as in Example 1 except that the medium refractive index layer was formed in the manner described above, and the produced protective layer-bearing infrared reflective film was then attached to a glass substrate.

Example 6

A protective layer-bearing infrared reflective film was produced in the same manner as in Example 1 except that the thickness of the medium refractive index layer was changed to 80 nm and the thickness of the high refractive index layer was changed to 100 nm, and the produced protective layer-bearing infrared reflective film was then attached to a glass substrate.

Example 7

A protective layer-bearing infrared reflective film was produced in the same manner as in Example 1 except that the thickness of the high refractive index layer was changed to 210 nm and the thickness of the low refractive index layer was changed to 150 nm, and the produced protective layer-bearing infrared reflective film was then attached to a glass substrate.

Example 8

A protective layer-bearing infrared reflective film was produced in the same manner as in Example 1 except that the thickness of the medium refractive index layer was changed to 80 nm and the thickness of the low refractive index layer was changed to 120 nm, and the produced protective layer-bearing infrared reflective film was then attached to a glass substrate.

Example 9

A protective layer-bearing infrared reflective film was produced in the same manner as in Example 1 except that a cholesteric liquid crystal polymer layer was formed in the following manner on a surface of the transparent substrate of Example 1 that was opposite to the protective layer (the non-adhesion promoted surface of the PET film) after the protective layer was formed, and the produced protective layer-bearing infrared reflective film was then attached to a glass substrate.

Formation of Cholesteric Liquid Crystal Polymer Layer

A cholesteric liquid crystal polymer coating material was prepared by mixing and stirring the following materials:

(1) 86.4 parts of liquid crystal compound I having a polymerizable functional group (high melting point liquid crystal compound, trade name PLC-7700 available from ADEKA Corporation, melting point: 90° C.);

(2) 9.6 parts of liquid crystal compound II having a polymerizable functional group (low melting point liquid crystal compound, trade name PLC-8100 available from ADEKA Corporation, melting point: 65° C.);

(3) 4.0 parts of chiral agent (right-handed chiral agent, trade name CNL-715 available from ADEKA Corporation);

(4) 1.5 parts of multifunctional acrylate compound (trade name Light Acrylate PE-3A available from Kyoeisha Chemical Co., Ltd.);

(5) 3.0 parts of photopolymerization initiator (trade name Irgacure 819 available from BASF Ltd.); and (6) 464 parts of solvent (cyclohexanone).

A coating film was formed by applying the cholesteric liquid crystal polymer coating material onto a surface of the protective layer-bearing infrared reflective film produced in Example 1 on which the infrared reflective layer was not formed by using a micro-gravure coater, and then dried at 100° C. The coating film was irradiated with ultraviolet rays in an amount of 300 mJ/cm$^2$ with a high-pressure mercury lamp so as to cure the coating material, and a right-handed cholesteric liquid crystal polymer layer (thickness: 3 μm) was formed. The right-handed cholesteric liquid crystal polymer layer had a center reflection wavelength of 890 nm.

Example 10

A protective layer-bearing infrared reflective film was produced in the same manner as in Example 1 except that the aforementioned PET film A4100 was used as a transparent substrate, a conductive stacked film (infrared reflective layer) having a three-layer structure composed of a 30 nm thick ZnO (zinc oxide) layer, a 12 nm thick silver layer and a 30 nm thick ZnO layer was formed on the adhesion promoted surface of the PET film by sputtering so as to produce an infrared reflective layer-bearing transparent substrate, and the produced protective layer-bearing infrared reflective film was then attached to a glass substrate.

Comparative Example 1

A 130 nm thick first medium refractive index layer was formed by using the medium refractive index coating material A in the same manner as in Example 1. Next, a medium refractive index coating material C was produced by mixing, in a Disper, 20 parts of urethane modified acrylate resin DPHA-40H used in Example 2, 0.4 parts of photopolymerization initiator Irgacure 184 used in Example 2, and 80 parts of methyl isobutyl ketone. The refractive index of the produced medium refractive index coating material C was measured by the above-described method and found to be 1.52. After that, the medium refractive index coating material C was applied onto the first medium refractive index layer and dried so as to have a dry thickness of 0.7 μm, and thereafter irradiated with ultraviolet rays in an amount of 300 mJ/cm$^2$ with a high-pressure mercury lamp so as to cure the coating material, and a 0.7 μm thick second medium refractive index layer was thereby formed. A protective layer-bearing infrared reflective film was produced in the same manner as in Example 1 except that only the first medium refractive index layer and the second medium refractive index layer were formed as the protective layer in the manner described above, and the produced protective layer-bearing infrared reflective film was then attached to a glass substrate.

In FIG. 3, a reflective spectrum of the protective layer-side surface of the protective layer-bearing infrared reflective film is indicated by Comparative Example 1. It can be seen from FIG. 3 that significant fluctuations of peaks and valleys (ripple) are observed in the reflective spectrum in the visible light range of Comparative Example 1.

Comparative Example 2

A protective layer-bearing infrared reflective film was produced in the same manner as in Example 1 except that the medium refractive index layer was not formed, and the produced protective layer-bearing infrared reflective film was then attached to a glass substrate.

Comparative Example 3

A protective layer-bearing infrared reflective film was produced in the same manner as in Example 1 except that the high refractive index layer was not formed, and the produced protective layer-bearing infrared reflective film was then attached to a glass substrate.

Comparative Example 4

A protective layer-bearing infrared reflective film was produced in the same manner as in Example 1 except that a 300 nm thick high refractive index layer was formed on the infrared reflective layer by using the high refractive index coating material A in the same manner as in Example 1, a 130 nm thick medium refractive index layer was formed on the high refractive index layer by using the medium refractive index coating material A in the same manner as in Example 1, and a 100 nm thick low refractive index layer was formed on the medium refractive index layer by using the low refractive index coating material A in the same manner as in Example 1, and the produced protective layer-bearing infrared reflective film was then attached to a glass substrate.

Comparative Example 5

A protective layer-bearing infrared reflective film was produced in the same manner as in Example 1 except that a 130 nm thick medium refractive index layer was formed on the infrared reflective layer by using the medium refractive index coating material A in the same manner as in Example 1, a 100 nm thick low refractive index layer was formed on the medium refractive index layer by using the low refractive index coating material A in the same manner as in Example 1, and a 300 nm high refractive index layer was formed on the low refractive index layer by using the high refractive index coating material A in the same manner as in Example 1, and the produced protective layer-bearing infrared reflective film was then attached to a glass substrate.

Evaluation of Transparent Heat-Shielding/Heat-Insulating Member

The protective layer-bearing infrared reflective films of Examples 1 to 10 and Comparative Examples 1 to 5 described above, each being attached to a glass substrate, were subjected to the following measurements so as to obtain visible light transmittance, haze, normal emissivity, shading coefficient and heat transmission coefficient. In addition, the protective layer-bearing infrared reflective films were evaluated in terms of the initial adhesion of the protective layer, adhesion after a weather resistance test and scratch resistance, and furthermore, iridescent property and angle dependence were observed as the appearance of the protective layer-bearing infrared reflective film.

Visible Light Transmittance

Spectral transmittance was measured in a range of 380 to 780 nm by using a UV-Vis-NIR spectrophotometer Ubest V-570 type (trade name) available from JASCO Corporation, with the glass substrate side being set as the light-entering side, and the visible light transmittance of a produced protective layer-bearing infrared reflective film being attached to a glass substrate was calculated based on JIS A5759.

Haze

Haze value was measured based on JIS K7136 by using a haze meter NDH-2000 (trade name) available from Nippon Denshoku Industries Co., Ltd. with the glass substrate side being set as the light-entering side.

Normal Emissivity

Normal emissivity was obtained based on JIS R3106 by attaching an attachment for regular reflectance measurement to an infrared spectrophotometer IR Prestige 21 (trade name) available from Shimadzu Corporation and measuring a spectral reflectance in a range of 5 to 25.2 μm on the protective layer side surface of a protective layer-bearing infrared reflective film.

Shading Coefficient

The shading coefficient of a protective layer-bearing infrared reflective film being attached to a glass substrate was obtained from the values of solar transmittance, solar reflectance and normal emissivity, the solar transmittance and the solar reflectance being obtained according to JIS A5759 and the normal emissivity being obtained according to JIS R3106 based on spectral transmittance and spectral reflectance measured in a range of 300 to 2500 nm by using the aforementioned UV-Vis-NIR spectrophotometer Ubest V570 type, with the glass substrate side being set as the light-entering side.

Heat Transmission Coefficient

The heat transmission coefficient of a protective layer-bearing infrared reflective film was obtained according to JIS A5759 based on the normal emissivity of the protective layer side surface and the glass substrate side surface of the protective layer-bearing infrared reflective film determined according to JIS R3106 based on the spectral reflectance of the protective layer side surface and the glass substrate side surface of the protective layer-bearing infrared reflective film measured in a range of 5 to 25.2 μm by attaching an attachment for regular reflectance measurement to the aforementioned infrared spectrophotometer IR Prestige 21.

Initial Adhesion

A grid tape separation test according to JIS D0202-1988 was performed on the protective layer side surface of a protective layer-bearing infrared reflective film. To be specific, adhesion was evaluated by applying a cellophane tape CT24 (trade name) available from Nichiban Co., Ltd in close contact to the protective layer by using the pad of the finger and thereafter peeling off the tape therefrom. Evaluation was made by the number of grid squares remaining without being taken away among 100 grid squares, and a rating of 100/100 was given if the protective layer was not taken away at all, and a rating of 0/100 was given if the protective layer was completely taken away.

Adhesion After Weather Resistance Test

A weather resistance test according to JIS A5759 was performed in which a protective layer-bearing infrared reflective film was irradiated with a sunshine carbon arc lamp for 1000 hours, and thereafter adhesion was evaluated in the same manner as the initial adhesion described above.

Scratch Resistance

Steel wool (#0000) available from Bonstar Sales Co., Ltd. was placed on the protective layer of a protective layer-bearing infrared reflective film, and then moved back and forth 10 times under a load of 250 g/cm². After that, the surface condition of the protective layer was visually observed and evaluated based on the following three criteria:

A: no scratches were found;

B: a few (5 or less) scratches were found; and

C: a large number of scratches were found.

Appearance (Iridescent Property)

The appearance of a protective layer-bearing infrared reflective film was visually observed from the protective layer side under a three-wavelength fluorescent lamp, and evaluated based on the following three criteria:

A: an iridescent pattern was almost not found, and little changes in reflection color were seen even when observed from different angles;

B: an iridescent pattern was slightly found, and changes in reflection color were slightly seen when observed from different angles; and C: an iridescent pattern was clearly found, and changes in reflection color were clearly seen when observed from different angles.

Appearance (Angle Dependence)

The appearance of a protective layer-bearing infrared reflective film was visually observed from the protective layer side under a three-wavelength fluorescent lamp, and the state of reflection color observed from the front and that from a different angle were evaluated based on the following three criteria:

A: the difference in reflection color between when observed from the front and when observed from a different angle was almost not seen as a color change;

B: the difference in reflection color between when observed from the front and when observed from a different angle was slightly seen as a color change; and C: the difference in reflection color between when observed from the front and when observed from a different angle was clearly seen as a color change.

The above results are shown in Tables 1 to 3 together with the layer configurations of the transparent heat-shielding/heat-insulating members.

TABLE 1

| | | Ex. 1 | Ex. 2 | Ex. 3 |
|---|---|---|---|---|
| Layer Configuration | Third Layer | Low Refractive Index Coating Material A Thickness: 100 nm Refractive Index: 1.38 | Low Refractive Index Coating Material A Thickness: 100 nm Refractive Index: 1.38 | Low Refractive Index Coating Material A Thickness: 100 nm Refractive Index: 1.38 |
| | Second Layer | High Refractive Index Coating Material A Thickness: 300 nm Refractive Index: 1.80 | High Refractive Index Coating Material B Thickness: 300 nm Refractive Index: 1.74 | High Refractive Index Coating Material C Thickness: 300 nm Refractive Index: 1.90 |
| | First Layer | Medium Refractive Index Coating Material A Thickness: 130 nm Refractive Index: 1.51 | Medium Refractive Index Coating Material A Thickness: 130 nm Refractive Index: 1.51 | Medium Refractive Index Coating Material A Thickness: 130 nm Refractive Index: 1.51 |
| | Infrared Reflective Layer | ITO/Ag/ITO | ITO/Ag/ITO | ITO/Ag/ITO |
| | Transparent Substrate | PET Film | PET Film | PET Film |
| | Cholesteric Liquid Crystal Polymer Layer | — | — | — |
| | Pressure-Sensitive Adhesive Layer | Thickness: 25 μm | Thickness: 25 μm | Thickness: 25 μm |
| | Glass Substrate | Thickness: 3 mm | Thickness: 3 mm | Thickness: 3 mm |
| Visible light Transmittance (%) | | 74.1 | 74.9 | 73.8 |
| Haze (%) | | 0.53 | 0.49 | 0.57 |
| Normal Emissivity | | 0.14 | 0.18 | 0.15 |
| Shading Coefficient | | 0.58 | 0.57 | 0.58 |
| Heat Transmission Coefficient (W/m$^2$ · K) | | 3.9 | 4.0 | 3.9 |
| Initial Adhesion | | 100/100 | 100/100 | 100/100 |
| Adhesion after Weather Resistance Test | | 100/100 | 100/100 | 100/100 |
| Scratch Resistance | | A | A | A |
| Appearance (Iridescent Property) | | A | A | A |
| Appearance (Angle Dependence) | | A | A | A |

| | | | Ex. 4 | Ex. 5 |
|---|---|---|---|---|
| | Layer Configuration | Third Layer | Low Refractive Index Coating Material B Thickness: 100 nm Refractive Index: 1.40 | Low Refractive Index Coating Material A Thickness: 100 nm Refractive Index: 1.38 |
| | | Second Layer | High Refractive Index Coating Material A Thickness: 300 nm Refractive Index: 1.80 | High Refractive Index Coating Material A Thickness: 300 nm Refractive Index: 1.80 |
| | | First Layer | Medium Refractive Index Coating Material A Thickness: 130 nm Refractive Index: 1.51 | Medium Refractive Index Coating Material B Thickness: 130 nm Refractive Index: 1.50 |
| | | Infrared Reflective Layer | ITO/Ag/ITO | ITO/Ag/ITO |
| | | Transparent Substrate | PET Film | PET Film |
| | | Cholesteric Liquid Crystal Polymer Layer | — | — |
| | | Pressure-Sensitive Adhesive Layer | Thickness: 25 μm | Thickness: 25 μm |
| | | Glass Substrate | Thickness: 3 mm | Thickness: 3 mm |
| | Visible light Transmittance (%) | | 74.0 | 74.0 |
| | Haze (%) | | 0.52 | 0.67 |
| | Normal Emissivity | | 0.14 | 0.16 |
| | Shading Coefficient | | 0.58 | 0.57 |
| | Heat Transmission Coefficient (W/m$^2$ · K) | | 3.9 | 3.9 |
| | Initial Adhesion | | 100/100 | 100/100 |
| | Adhesion after Weather Resistance Test | | 100/100 | 91/100 |
| | Scratch Resistance | | B | A |
| | Appearance (Iridescent Property) | | A | A |
| | Appearance (Angle Dependence) | | A | A |

TABLE 2

| | | Ex. 6 | Ex. 7 | Ex. 8 |
|---|---|---|---|---|
| Layer Configuration | Third Layer | Low Refractive Index Coating Material A Thickness: 100 nm Refractive Index: 1.38 | Low Refractive Index Coating Material A Thickness: 150 nm Refractive Index: 1.38 | Low Refractive Index Coating Material A Thickness: 120 nm Refractive Index: 1.38 |
| | Second Layer | High Refractive Index Coating Material A Thickness: 100 nm Refractive Index: 1.80 | High Refractive Index Coating Material A Thickness: 210 nm Refractive Index: 1.80 | High Refractive Index Coating Material A Thickness: 300 nm Refractive Index: 1.80 |
| | First Layer | Medium Refractive Index Coating Material A Thickness: 80 nm Refractive Index: 1.51 | Medium Refractive Index Coating Material A Thickness: 130 nm Refractive Index: 1.51 | Medium Refractive Index Coating Material A Thickness: 80 nm Refractive Index: 1.51 |
| | Infrared Reflective Layer | ITO/Ag/ITO | ITO/Ag/ITO | ITO/Ag/ITO |
| | Transparent Substrate | PET Film | PET Film | PET Film |
| | Cholesteric Liquid Crystal Polymer Layer | — | — | — |
| | Pressure-Sensitive Adhesive Layer | Thickness: 25 µm | Thickness: 25 µm | Thickness: 25 µm |
| | Glass Substrate | Thickness: 3 mm | Thickness: 3 mm | Thickness: 3 mm |
| Visible Light Transmittance (%) | | 76.7 | 74.7 | 75.6 |
| Haze (%) | | 0.47 | 0.50 | 0.53 |
| Normal Emissivity | | 0.13 | 0.14 | 0.14 |
| Shading Coefficient | | 0.59 | 0.58 | 0.57 |
| Heat Transmission Coefficient (W/m$^2$ · K) | | 3.8 | 3.9 | 3.9 |
| Initial Adhesion | | 100/100 | 100/100 | 100/100 |
| Adhesion after Weather Resistance Test | | 100/100 | 100/100 | 100/100 |
| Scratch Resistance | | B | A | A |
| Appearance (Iridescent Property) | | A | A | A |
| Appearance (Angle Dependence) | | A | A | A |

| | | Ex. 9 | Ex. 10 |
|---|---|---|---|
| Layer Configuration | Third Layer | Low Refractive Index Coating Material A Thickness: 100 nm Refractive Index: 1.38 | Low Refractive Index Coating Material A Thickness: 100 nm Refractive Index: 1.38 |
| | Second Layer | High Refractive Index Coating Material A Thickness: 300 nm Refractive Index: 1.80 | High Refractive Index Coating Material A Thickness: 300 nm Refractive Index: 1.80 |
| | First Layer | Medium Refractive Index Coating Material A Thickness: 130 nm Refractive Index: 1.51 | Medium Refractive Index Coating Material A Thickness: 130 nm Refractive Index: 1.51 |
| | Infrared Reflective Layer | ITO/Ag/ITO | ZnO/Ag/ZnO |
| | Transparent Substrate | PET Film | PET Film |
| | Cholesteric Liquid Crystal Polymer Layer | Thickness: 3 µm | — |
| | Pressure-Sensitive Adhesive Layer | Thickness: 25 µm | Thickness: 25 µm |
| | Glass Substrate | Thickness: 3 mm | Thickness: 3 mm |
| Visible Light Transmittance (%) | | 75.5 | 77.1 |
| Haze (%) | | 0.67 | 0.52 |
| Normal Emissivity | | 0.14 | 0.15 |
| Shading Coefficient | | 0.55 | 0.59 |
| Heat Transmission Coefficient (W/m$^2$ · K) | | 3.9 | 3.8 |
| Initial Adhesion | | 100/100 | 100/100 |
| Adhesion after Weather Resistance Test | | 100/100 | 100/100 |
| Scratch Resistance | | A | A |
| Appearance (Iridescent Property) | | A | A |
| Appearance (Angle Dependence) | | A | A |

TABLE 3

| | | Comp. Ex. 1 | Comp. Ex. 2 | Comp. Ex. 3 |
|---|---|---|---|---|
| Layer Configuration | Third Layer | Medium Refractive Index Coating Material C Thickness: 0.7 μm Refractive Index: 1.52 | Low Refractive Index Coating Material A Thickness: 100 nm Refractive Index: 1.38 | Low Refractive Index Coating Material A Thickness: 100 nm Refractive Index: 1.38 |
| | Second Layer | — | High Refractive Index Coating Material A Thickness: 300 nm Refractive Index: 1.80 | — |
| | First Layer | Medium Refractive Index Coating Material A Thickness: 130 nm Refractive Index: 1.51 | — | Medium Refractive Index Coating Material A Thickness: 130 nm Refractive Index: 1.51 |
| | Infrared Reflective Layer | ITO/Ag/ITO | ITO/Ag/ITO | ITO/Ag/ITO |
| | Transparent Substrate | PET Film | PET Film | PET Film |
| | Cholesteric Liquid Crystal Polymer Layer | — | — | — |
| | Pressure-Sensitive Adhesive Layer | Thickness: 25 μm | Thickness: 25 μm | Thickness: 25 μm |
| | Glass Substrate | Thickness: 3 mm | Thickness: 3 mm | Thickness: 3 mm |
| Visible Light Transmittance (%) | | 71.3 | 69.9 | 72.6 |
| Haze (%) | | 0.35 | 0.49 | 0.31 |
| Normal Emissivity | | 0.18 | 0.14 | 0.12 |
| Shading Coefficient | | 0.56 | 0.55 | 0.57 |
| Heat Transmission Coefficient (W/m$^2$·K) | | 4.0 | 3.9 | 3.8 |
| Initial Adhesion | | 100/100 | 51/100 | 100/100 |
| Adhesion after Weather Resistance Test | | 100/100 | 23/100 | 100/100 |
| Scratch Resistance | | A | B | C |
| Appearance (Iridescent Property) | | C | B | B |
| Appearance (Angle Dependence) | | C | B | B |

| | | Comp. Ex. 4 | Comp. Ex. 5 |
|---|---|---|---|
| Layer Configuration | Third Layer | Low Refractive Index Coating Material A Thickness: 100 nm Refractive Index: 1.38 | High Refractive Index Coating Material A Thickness: 300 nm Refractive Index: 1.80 |
| | Second Layer | Medium Refractive Index Coating Material A Thickness: 130 nm Refractive Index: 1.51 | Low Refractive Index Coating Material A Thickness: 100 nm Refractive Index: 1.38 |
| | First Layer | High Refractive Index Coating Material A Thickness: 300 nm Refractive Index: 1.80 | Medium Refractive Index Coating Material A Thickness: 130 nm Refractive Index: 1.51 |
| | Infrared Reflective Layer | ITO/Ag/ITO | ITO/Ag/ITO |
| | Transparent Substrate | PET Film | PET Film |
| | Cholesteric Liquid Crystal Polymer Layer | — | — |
| | Pressure-Sensitive Adhesive Layer | Thickness: 25 μm | Thickness: 25 μm |
| | Glass Substrate | Thickness: 3 mm | Thickness: 3 mm |
| Visible Light Transmittance (%) | | 71.9 | 72.9 |
| Haze (%) | | 0.41 | 0.43 |
| Normal Emissivity | | 0.14 | 0.18 |
| Shading Coefficient | | 0.56 | 0.57 |
| Heat Transmission Coefficient (W/m$^2$·K) | | 3.9 | 3.9 |
| Initial Adhesion | | 54/100 | 100/100 |
| Adhesion after Weather Resistance Test | | 25/100 | 100/100 |
| Scratch Resistance | | B | B |
| Appearance (Iridescent Property) | | C | C |
| Appearance (Angle Dependence) | | C | C |

As shown in Tables 1 to 3, it can be seen that the transparent heat-shielding/heat-insulating members of Examples 1 to 3 and 7 to 10 are superior in terms of appearance such as a reflection color change caused by the iridescent phenomenon and the viewing angle because the difference in reflectance between adjacent peaks and valleys was small in their reflective spectrums in the visible light range. Also, it can be seen that the transparent heat-shielding/heat-insulating members exhibited low shading coefficients and low heat transmission coefficients, which indicates that they are superior in terms of both heat shielding property in summer and heat insulation property in winter, and are also superior in terms of the adhesion of the protective layer and scratch resistance. Furthermore, Example 9 in which a cholesteric liquid crystal polymer layer was formed is superior in terms of shading coefficient and visible light transmittance to Example 1 in which a cholesteric liquid crystal polymer layer was not formed. Example 4 exhibited slightly poor scratch resistance because the low refractive index layer was formed using a coating material that did not contain a silica-based material. Also, Example 5 exhibited slightly poor adhesion after the weather resistance test because the medium refractive index layer was formed using an ionizing radiation curable resin. Also, Example 6, in which the total thickness of the protective layer was 280 nm, which was less than 300 nm, exhibited slightly poor scratch resistance.

On the other hand, in Comparative Example 1, as the protective layer, the second medium refractive index layer made of commonly used acrylic resin was stacked on the first medium refractive index layer without providing a high refractive index layer and a low refractive index layer, and thus the difference in reflectance between adjacent peaks and valleys in the reflective spectrum in the visible light range was large, as a result of which the appearance was reduced, or in other words, an iridescent pattern was clearly observed in the appearance of the obtained film, and when observed from different angles of reflected light, the reflection color changing between red and green was observed.

In Comparative Example 2 in which a medium refractive index layer was not formed, the appearance slightly decreased, the adhesion between the infrared reflective layer and the protective layer also decreased, and separation was partially observed. In Comparative Example 3 in which a high refractive index layer was not formed, the strength of the protective layer decreased, and thus the reduction of scratch resistance was seen. In Comparative Example 4 in which the protective layer was formed by forming, on the infrared reflective layer, a high refractive index layer, a medium refractive index layer and a low refractive index layer in this order, an iridescent pattern was clearly observed in the appearance of the obtained film, in addition, when observed from different angles of reflected light, the variation of the reflection color was clearly recognized as a color change, and the adhesion between the infrared reflective layer and the protective layer also decreased. In Comparative Example 5 in which the protective layer was formed by forming, on the infrared reflective layer, a medium refractive index layer, a low refractive index layer and a high refractive index layer in this order, an iridescent pattern was clearly observed in the appearance of the obtained film, and when observed from different angles of reflected light, the variation of the reflection color was clearly recognized as a color change.

The present invention can provide a transparent heat-shielding/heat-insulating member having an excellent heat-shielding function and heat-insulating function, wherein excellent scratch resistance and adhesion of the protective layer can be achieved while a high heat insulation property is maintained, and a reflection color change in the appearance caused by the iridescent phenomenon and the viewing angle is small.

The present invention may be embodied in other forms without departing from the spirit or essential characteristics thereof. The embodiments disclosed in this application are to be considered in all respects as illustrative and not limiting. The scope of the present invention is indicated by the appended claims rather than by the foregoing description, and all changes which come within the meaning and range of equivalency of the claims are intended to be embraced therein.

What is claimed is:

1. A transparent heat-shielding/heat-insulating member comprising a transparent substrate and a functional layer formed on the transparent substrate,
wherein the functional layer includes, from the transparent substrate side, an infrared reflective layer and a protective layer in this order,
the protective layer includes, from the infrared reflective layer side, a medium refractive index layer, a high refractive index layer and a low refractive index layer in this order,
the infrared reflective layer includes a metal oxide layer and a metal layer,
the low refractive index layer is composed of a coating layer containing an ionizing radiation curable resin,
the medium refractive index layer has a light refractive index at a wavelength of 550 nm of 1.45 to 1.55 and a thickness of 80 to 200 nm,
the high refractive index layer has a light refractive index at a wavelength of 550 nm of 1.65 to 1.95 and a thickness of 100 to 350 nm,
the low refractive index layer has a light refractive index at a wavelength of 550 nm of 1.30 to 1.45 and a thickness of 70 to 150 nm, and
a normal emissivity based on JIS R3106 is 0.2 or less on the functional layer side.

2. The transparent heat-shielding/heat-insulating member according to claim 1,
wherein the medium refractive index layer is made of a modified polyolefin resin having an acidic group.

3. The transparent heat-shielding/heat-insulating member according to claim 1,
wherein the high refractive index layer is made of a resin and inorganic fine particles.

4. The transparent heat-shielding/heat-insulating member according to claim 1,
wherein the low refractive index layer further contains inorganic fine particles, and
the inorganic fine particles comprise hollow silica.

5. The transparent heat-shielding/heat-insulating member according to claim 1,
wherein the infrared reflective layer is made of a conductive stacked film including a metal oxide layer, a metal layer and a metal oxide layer in this order.

6. The transparent heat-shielding/heat-insulating member according to claim 1,
wherein after a 1000-hour weather resistance test according to JIS A5759, separation of the protective layer is not observed in a cross cut adhesion test according to JIS D0202-1998.

7. The transparent heat-shielding/heat-insulating member according to claim 1,
wherein a cholesteric liquid crystal polymer layer is further formed on a surface of the transparent substrate on which the infrared reflective layer is not formed.

8. The transparent heat-shielding/heat-insulating member according to claim 7,
wherein the cholesteric liquid crystal polymer layer is formed by photopolymerization of a material containing a liquid crystal compound having a polymerizable functional group, a chiral agent having a polymerizable functional group and a multifunctional acrylate compound.

* * * * *